US008655365B2

(12) United States Patent
Leclerc et al.

(10) Patent No.: US 8,655,365 B2
(45) Date of Patent: Feb. 18, 2014

(54) METHOD FOR MANAGING RADIO LINKS WITHIN A RADIO COMMUNICATION SYSTEM WITH MOBILE UNITS, AND EQUIPMENT ADAPTED TO IMPLEMENTING THE METHOD

(75) Inventors: Brice Leclerc, Nozay (FR); Alberto Conte, Nozay (FR)

(73) Assignee: Alcatel Lucent, Paris (FR)

( * ) Notice: Subject to any disclaimer, the term of this patent is extended or adjusted under 35 U.S.C. 154(b) by 153 days.

(21) Appl. No.: 13/143,407

(22) PCT Filed: Jan. 8, 2010

(86) PCT No.: PCT/FR2010/050024
§ 371 (c)(1),
(2), (4) Date: Jul. 6, 2011

(87) PCT Pub. No.: WO2010/079306
PCT Pub. Date: Jul. 15, 2010

(65) Prior Publication Data
US 2011/0269467 A1 Nov. 3, 2011

(30) Foreign Application Priority Data
Jan. 9, 2009 (FR) ...................................... 09 50108

(51) Int. Cl.
*H04W 36/00* (2009.01)
(52) U.S. Cl.
USPC ....................................................... 455/436
(58) Field of Classification Search
USPC ............ 455/436–442, 432.1, 426.1; 370/331, 370/328, 338
See application file for complete search history.

(56) References Cited

U.S. PATENT DOCUMENTS 7,970,429 B2 * 6/2011 Islam et al. .................. 455/525
8,036,656 B2 * 10/2011 Jeong et al. .................. 455/434

(Continued)

FOREIGN PATENT DOCUMENTS

EP           2 003 915 A1   12/2008
WO    WO 2005/099185 A1    10/2005

OTHER PUBLICATIONS

International Search Report for PCT/FR2010/050024 dated May 12, 2010.

(Continued)

*Primary Examiner* — Brandon Miller
(74) *Attorney, Agent, or Firm* — Fay Sharpe LLP (57) ABSTRACT

In an access network infrastructure of a cellular radio communication network, comprising a first radio access point serving at least one radio cell and capable of communicating, over a radio interface, with at least one user equipment item located within the radio coverage of at least one of the radio cells, first and second criteria for establishing a radio communication link with a radio access point are defined, with these two criteria being distinct from one another, as well as a set of user equipment associated with the first radio access point. Whenever user equipment is located within the radio coverage of at least one of the cells of the first radio access point, and the first criterion for establishing a radio communication link or the second criterion for establishing a radio communication link is applied, depending on whether or not the user equipment belongs to the set of user equipment associated with the first radio access point, for the purposes of establishing a radio communication link between the user equipment and the first radio access point whenever the applied radio communication link establishment criterion is fulfilled.

22 Claims, 5 Drawing Sheets

(56) References Cited

U.S. PATENT DOCUMENTS

| | | | |
|---|---|---|---|
| 8,280,382 B2 * | 10/2012 | Foster et al. | 455/444 |
| 2004/0192211 A1 * | 9/2004 | Gallagher et al. | 455/67.11 |
| 2009/0092096 A1 * | 4/2009 | Czaja et al. | 370/331 |

OTHER PUBLICATIONS

TR 25.832, 3GPP, Technical Specification Group Radio Access Network, Manifestations of Handover and SRNS Relocation, Release 4, V4.0.0, Mar. 2001, 13 Pages.

TS 25.215, 3GPP, Technical Specification Group Radio Access Network, Physical Layer—Measurements (FDD), Release 6, V6.4.0, Sep. 2005, 18 Pages.

TS 25.304, 3GPP, Technical Specification Group Radio Access Network, User Equipment (UE) Procedures in Idle Mode and Procedures for Call Reselection in Connected Mode, Release 6, V6.10.0, Mar. 2008, 38 Pages.

TS 25.331, 3GPP, Technical Specification Group Radio Access Network, Radio Resource Control (RRC) Protocol Specification, Release 6, V6.19.0, Sep. 2008, Section 7, pp. 1-3 & 41-44.

TS 25.433, 3GPP, Technical Specification Group Radio Access Network, Utran Iub Interface Node B Application Part (NBAP) Signalling, Release 6, V6.17.0, Section 8, Jun. 2008, pp. 1-7 & 27-160.

* cited by examiner

FIG_2

FIG_5

FIG_6

METHOD FOR MANAGING RADIO LINKS WITHIN A RADIO COMMUNICATION SYSTEM WITH MOBILE UNITS, AND EQUIPMENT ADAPTED TO IMPLEMENTING THE METHOD

The present invention pertains to the management of radio links within a radio communication system with mobile units.

The recent development of the concept of broadband access in a residential context has led to the emergence of new solutions designed to meet this need, in particular in the wireless access domain. A set of recent solutions, grouped under the common term "femto" or "residential gateway", in particular offer residential users access to high-speed wireless transmissions. The femto solution typically provides a radio interface compliant with a third generation radio communication standard or equivalent, and is introduced into an infrastructure of a corresponding access network infrastructure. An example of this is provided by the femto access points compliant with the UMTS ("Universal Mobile Telecommunication System") third generation standard, which are capable of communicating with user equipment on the radio interface in accordance with the specifications for communication over the air interface for UMTS systems, and have a communication interface with a UMTS type access network infrastructure.

A femto access point typically consists of a base station router with low power, capable of sending and receiving radio signals in accordance with the radio interface specifications of a radio communication system, for example cellular, with which it is associated. It is thus used to extend the radio coverage of said system, supplying means for coverage inside buildings (indoor coverage), but also radio coverage on a residential level for residential wireless broadband access. The name "femto" generally refers to the small size of the radio cell generated by these access points when they form a part of a cellular radio communication network, in comparison with the size of the radio cells generated by the "traditional" base stations of a cellular radio communication system. The femto access point is also connected to an infrastructure of an access network infrastructure of the cellular radio communication system with which it is associated using a broadband communication interface, generally of the same type as the interfaces available in a residential environment, such as for example an ADSL line or a wired network interface.

In a cellular radio communication system, the femto access points serve small cells, generally known as femtocells. An operator can create a hierarchy between different levels of cells, with each level being characterised by the size of the cells it contains. An example of such a classification is given in FIG. 1, which shows three levels of groups of cells: the first level contains the very small cells, typically of a few metres, known as femtocells. The next level up contains cells which are larger than the femtocells, known as "microcells". Lastly, the third and final level contains the largest cells, known as "macrocells". Note that the coverage of the femtocells, microcells and macrocells overlaps in such a way that a geographical area may potentially be within the radio coverage of at least three cells, including a femtocell, a microcell and a macrocell. This type of hierarchical organisation of cells based on their size is sometimes known as Hierarchical Cell Structure (HCS).

Figure 1:
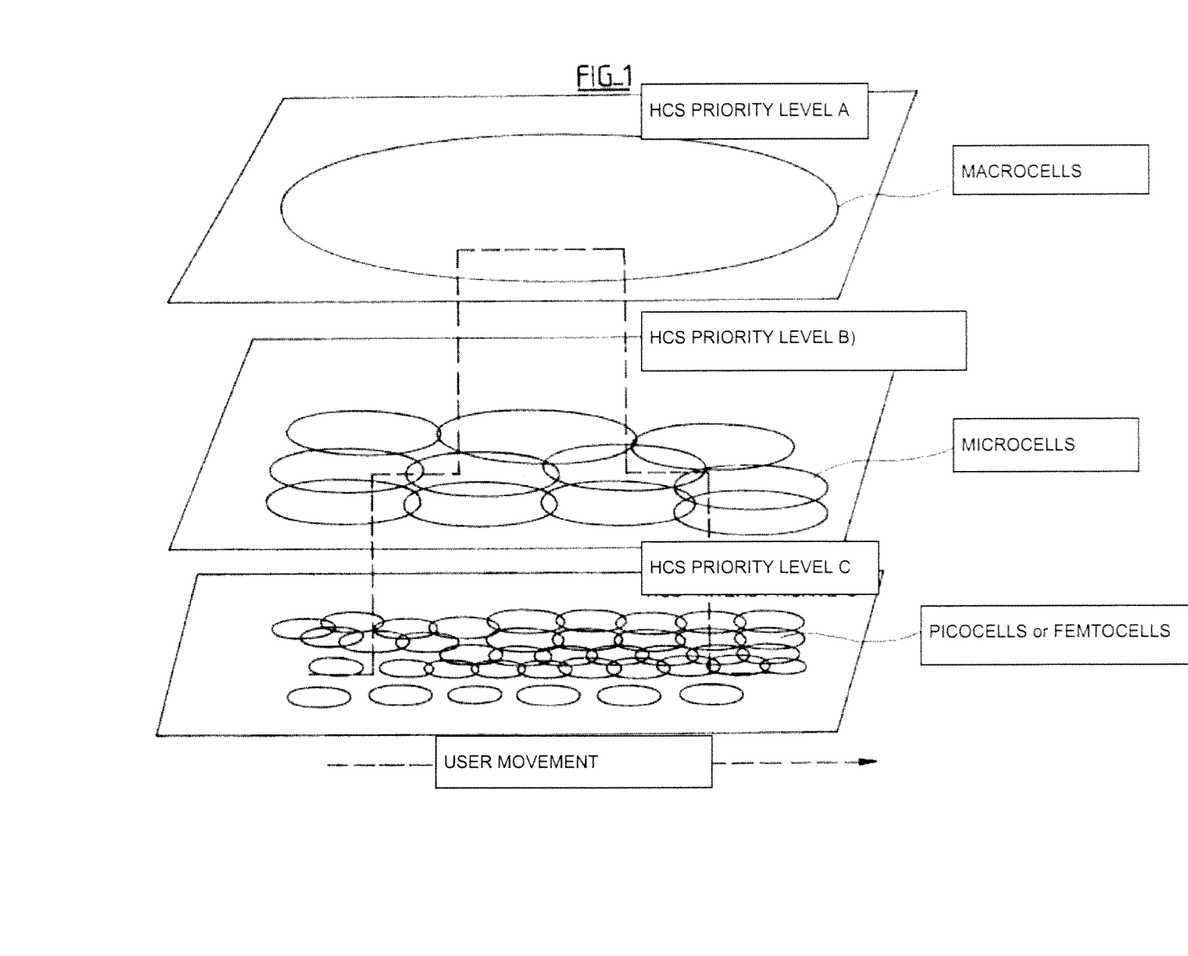
FIG. 1 shows a set of cells of a cellular radio communication system organised based on an HCS type hierarchy.

Radio link control procedures may be put in place in order, in a cellular radio communication system including a plurality of cell levels for which the respective radio coverage intersects, in other words they are colocated, as shown in FIG. 1, to optimise the quality of the transmissions and minimise the interference between users.

Furthermore, the management of the mobility of a mobile terminal in communication within a cellular system involves procedures for the transfer of radio communication links between cells. Such a transfer is commonly known as an intercell handover, or cell transfer. The distinction is made between a hard handover (or HHO), which involves instantly switching the communication from the base station of a first to that of a second cell, and a soft handover (or SHO), supported by certain systems and in which there is a phase of varying length in which the mobile unit communicates simultaneously with the base stations.

The third generation UMTS ("Universal Mobile Telecommunication System") system uses a Wideband Code-Division Multiple Access technique (W—CDMA), which allows it to support both HHOs and SHOs. Its LTE (Long Term Evolution) supports only HHOs.

The handover procedures are carried out in the cellular systems, generally automatically, in such a way as to ensure a radio link of sufficient quality to allow the communication to continue in favourable conditions for the mobile unit in connected mode, in other words with communication in progress. Other handover criteria also exist, based on considerations not directly linked to the propagation conditions, such as for example the distribution of the traffic based on the type of cells.

A handover procedure traditionally involves a measurement stage, in which at least one mobile station and one base station regularly take radio measurements relating to the propagation conditions, downstream (measurements at the mobile receiver) or upstream (measurements at the receiver of one or more base stations on signals from the mobile unit). If a communication channel is established between the mobile station and a base station, the measurements can be taken on this channel. These measurements reflect in particular the upstream and downstream signal level on the radio channel. They may also take into account an indicator of the quality of the radio link as well as an indicator of the distance separating the mobile station from the base station. Furthermore, the mobile station regularly takes measurements on the most powerful signals it receives from a certain number of neighbouring cells. In the other direction, the base stations of these neighbouring cells can also take measurements on the upstream signal.

These measurements are regularly sent to the entity of the system which manages the handover procedure. This procedure processes them by taking the average and assessing, through mathematical algorithms, whether they meet one or more pre-determined handover criteria.

In a cellular radio communication system in which the cells used are organised based on an HCS type structure, intercell handover control procedures can be envisaged aiming in particular to minimise the number of handovers carried out while preserving the quality of the communications and optimising the management of the radio resources. Each user equipment item located within the radio coverage of such a system can thus be assigned a cell corresponding to a level of the HCS layer. This assignment can be made based on the speed of the user equipment. High-speed user equipment will therefore be assigned a cell of a higher level ("macrocell"), while user equipment which is near-stationary or mobile but at low speeds will be assigned a cell from the lower level layers. Preference can also be given to the management of radio resources, and distributing the load represented by the user equipment for the cellular radio communication system over a plurality of levels, in particular once one of the levels is at its maximum capacity in terms of the use of radio resources.

The dashed line in FIG. 1 illustrates the change in levels for user equipment moving as shown in the figure. The speed of the user equipment increases gradually, with the result that said user equipment, having initially had a radio communication link with a cell of the lowest level of the femtocells, is switched to the intermediate level and then to the upper level of the macrocells. In the event of a load which is too great in the macrocell illustrated in FIG. 1, the user equipment is then switched again to the intermediate level. Then, if this level is itself highly loaded, the user equipment will be switched to the lower level (on the figure, the level of the femtocells).

One of the advantages for an operator of an HCS type cellular radio communication system is that it allows the cells of the higher level, in other words the cells with the widest radio coverage, to be unloaded to the cells of the lower levels. The lowest level, in other words the one containing the smallest cells (femtocells), also offers network users the advantage of providing broadband wireless access in a residential context, which is generally associated with attractive pricing structures.

However, in order to minimise the interference and to reduce the number of intercell handover procedures between cells of different levels, the femto access points available on the market or envisaged for the future have a very low transmission power (of around 1 watt), which considerably restricts their radio coverage and their capacity to automatically trigger intercell handovers to their cell level.

The purpose of the invention is to improve the situation.

For this reason, it proposes a method for the management of the resources of an access network infrastructure of a cellular radio communication network, said access network infrastructure comprising a first radio access point serving at least one radio cell and capable of communicating over a radio interface with at least one user equipment item located within the radio coverage of at least one of the radio cells. According to this method, considered in relation to user equipment located within the radio coverage of at least one of the cells of the first radio access point, a first criterion for establishing a radio communication link between user equipment and a radio access point is applied if the user equipment belongs to a pre-defined set of user equipment associated with the first radio access point, for the purposes of establishing a radio communication link between the user equipment and the first radio access point when said first criterion is met, and a second criterion for establishing a radio communication link between user equipment and a radio access point is applied, said second establishment criterion being distinct from the first criterion for establishing a radio communication link, if the user equipment does not belong to said pre-defined set of user equipment associated with the first radio access point, for the purposes of establishing a radio communication link between the user equipment and the first radio access point when said second criterion is fulfilled.

The criterion applied for establishing a radio communication link therefore varies depending on whether or not the user equipment belongs to a pre-defined set of user equipment associated with the radio access point concerned.

In one specific embodiment, pre-defined criteria are envisaged for establishing a radio link, for example relating to the quality of transmission between a radio access point and user equipment. In the latter case, it may advantageously be possible to measure a dimension representative of the quality of the radio transmission between the user equipment and the first radio access point, and thus establish a radio communication link when the dimension measured fulfils the first, or second respectively, criterion for establishing a radio communication link. The application of the radio criteria in this particular example may include the comparison with a threshold for the quality of reception by the user equipment.

The method proposed may advantageously be implemented in cellular radio communication networks, in which at least some or all of the radio cells of the radio access points of the access network infrastructure are distributed to form a plurality of categories, with each category containing one or more radio cells based on the size of their respective radio coverage. In this scenario, the first criterion is associated with all the cells of the same category.

The dimension representative of the quality of the radio transmission between said user equipment and the first radio access point may advantageously be chosen to represent a power level of a signal received from the first radio access point.

The method proposed may furthermore be advantageously applied to CDMA type access network infrastructures, in which case the dimension representative of the quality of the radio transmission between said user equipment and the first radio access point may be chosen as representative of a level of energy per chip received on a pilot channel of the first radio access point.

On the other hand, when the access network infrastructure includes a second radio access point serving at least one radio cell, a radio communication link being established between the user equipment and the second radio access point, it is also planned to delete the radio communication link between the user equipment and the second radio access point once the radio communication link between said equipment and the first radio access point is established.

Preference can thus be given to establishing radio communication links between user equipment and a radio access point with which it is associated, to the detriment of other radio communication links established with other radio access points with which the user equipment is not associated or for which there is no planned association with user equipment. These other links can be retained, in which case they will co-exist with the radio communication link established between the associated user equipment and radio access point, or they can be deleted in order to force the existence of a single radio communication link between the user equipment and the access network infrastructure, in this case the one established between the associated user equipment and radio access point.

The first radio access point may advantageously be chosen as constituting all or part of a residential or "femto" type radio access node.

According to another aspect, the invention proposes a device for the management of radio communication links of user equipment with at least one radio access point of an access network infrastructure of a cellular radio communication network including a first radio access point serving at least one radio cell, the device including interface means (MI) arranged to receive identification information from a cell within the radio coverage of which the user equipment is located, and control means (MC) arranged to compare the cell identification information received on the interface means (MI) with at least one radio cell identifier of said first radio access point and, when the identification information and the identifier match, to apply a first criterion for establishing a radio communication link, for the purposes of establishing a radio communication link between the user equipment and the first radio access point when said first criterion is fulfilled, and when the identification information and the identifier do not match, to apply a second criterion for establishing a radio communication link, distinct from the first criterion for establishing a radio communication link, for the purposes of establishing a radio communication link between the user equipment and the first radio access point when said second criterion is fulfilled.

In one specific embodiment of the device, the control means (MC) are arranged to apply first and second pre-defined criteria for establishing a radio communication link, for example relative to the quality of transmission between user equipment and a radio access point of the access network infrastructure. The interface means (MI) may, furthermore, be arranged to receive a measurement of a dimension representative of the quality of transmission between the user equipment and the first radio access point, and the control means (MC) also arranged to establish a radio communication link when the dimension measurement received on the interface means (MI) fulfils the first, or second respectively, criterion for establishing a radio communication link.

The control means (MC) may furthermore be arranged to apply first and second criteria for establishing a radio communication link including respectively first and second thresholds for the quality of reception by the user equipment.

This device for the management of radio communication links may advantageously be implemented within user equipment comprising means of communication (MCOM) over a radio interface with at least one radio access point of an access network infrastructure of a cellular radio communication network.

According to another aspect, the invention proposes a radio access point controller for an access network infrastructure of a cellular radio communication network, the access network infrastructure comprising a first radio access point serving at least one radio cell and capable of communicating over a radio interface with at least one user equipment item located within the radio coverage of at least one of the radio cells. The controller comprises reception means (MRC) arranged to receive identification information from user equipment located within the coverage of at least of the radio cells of the first radio access point, memory means (MMC) arranged to retain user equipment identifiers, said user equipment belonging to a pre-defined set of user equipment associated with said first radio access point, means for managing radio communication links between user equipment capable of communicating over a radio interface with at least one radio access point of the access network infrastructure and a radio access point of the access network infrastructure (MGC), arranged to control the establishment of radio communication links between the first radio access point and user equipment, and control means (MCC) arranged to compare identification information from user equipment received by the reception means with at least one of said user equipment identifiers and, when the identification information and at least one of said identifiers match, to request from the means for managing communication links the application of a first criterion for establishing a radio communication link, for the purposes of establishing a radio communication link between the user equipment and the first radio access point when said first criterion is fulfilled, and when the identification information does not match any of said identifiers, to request from the means for managing radio communication links the application of a second criterion for establishing a radio communication link, distinct from the first criterion for establishing a radio communication link, for the purposes of establishing a radio communication link between the user equipment and the first radio access point when said second criterion is fulfilled.

In one specific embodiment of the controller, the means for managing for radio communication links (MGC) are arranged to apply first and second pre-defined criteria for establishing a radio communication link, for example relative to the quality of transmission between user equipment and a radio access point of the access network infrastructure. The reception means (MRC) may, furthermore, be arranged to receive a measurement of a dimension representative of the quality of transmission between the user equipment and the first radio access point, the control means (MCC) also arranged to send the means for managing radio communication links (MGC) the measurement of the dimension received by the reception means, and the means for managing radio communication links (MGC) also arranged to establish a radio communication link when the measurement of the dimension fulfils the first, or second respectively, criterion for establishing a radio communication link.

The means for managing radio communication links (MGC) may also be arranged to apply first and second criteria comprising, respectively, first and second thresholds for the quality of reception by the user equipment.

The invention finally proposes a computer program that may be loaded into a memory associated with a processor, and comprising instructions for implementing a method as defined above when said program is executed by the processor, as well as a data-processing medium on which said program is stored.

Other features and advantages of the present invention will become apparent in the description below of non-limiting example embodiments, with reference to the attached drawings, in which.

The present description relates to a non-restrictive scenario of a femto type access point, included in an access network of a UMTS type cellular radio communication network in FDD ("Frequency Division Duplex") mode. However, the invention is not limited to this type of network. It in fact concerns all cellular radio communication networks, and in particular those which implement cell transfers (or handovers), in particular the circuit mode distribution networks, such as for example the CDMA and CDMA-2000 type networks, and the packet-mode distribution networks, such as for example the W-CDMA type networks (such as UMTS or FOMA networks) or WiMAX type networks.

Moreover, it is assumed in the following discussion by way of example but not of limitation that such non-wireline (or radio) communication equipment items (UE) are cellular mobile telephones. However, the invention is not limited to this type of non-wireline communication equipment. It in fact concerns all electronic devices (or terminals), mobile or portable, capable of establishing communication with a cellular radio communication network. As a result, it may also involve portable computers, personal digital assistants (or PDAs), or content receivers, since they are equipped with non-wireline communication means.

Figure 2:
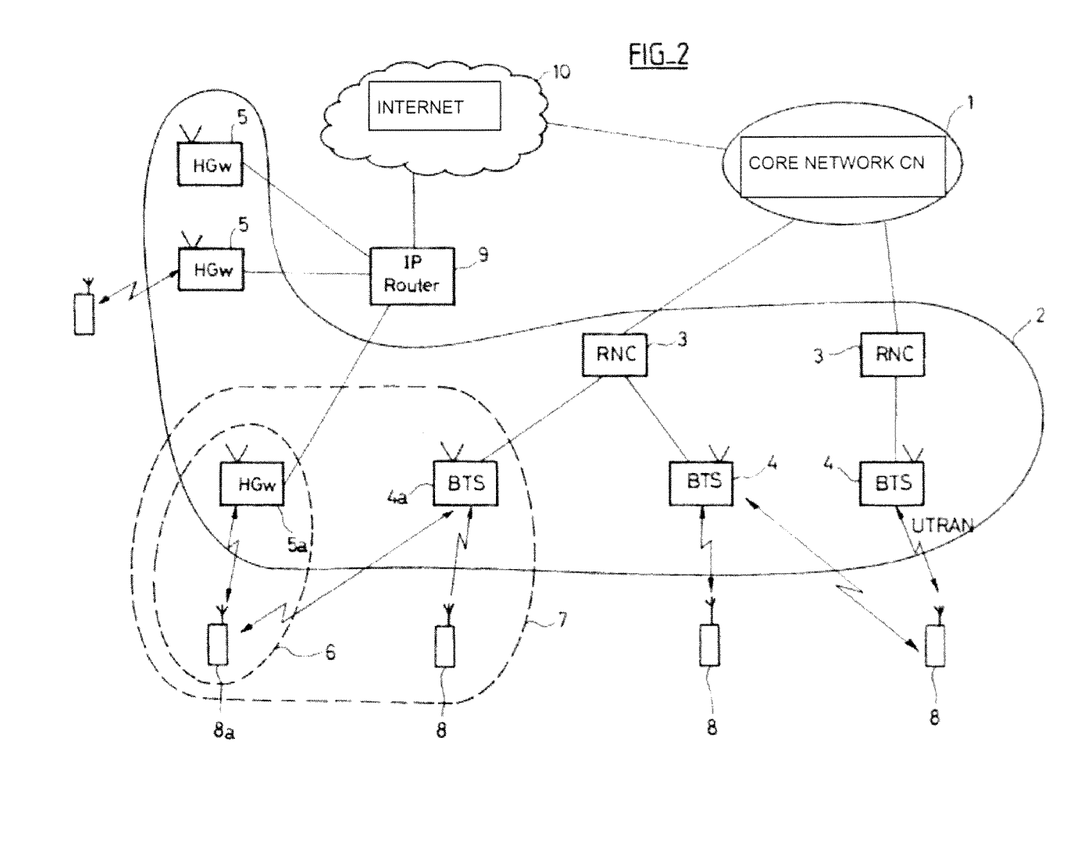
FIG. 2 shows an architecture diagram of a UMTS system to which the invention may apply.

FIG. 2 shows a cellular radio communication network including a UMTS type access network infrastructure including femto type access points. The UMTS is a radio communication system for which the access network, called UTRAN ("UMTS Terrestrial Radio Access Network"), uses code division multiple access (CDMA), in other words the symbols sent are multiplied by spreading codes consisting of samples called "chips", the rate of which is greater than that of the symbols sent. The spreading codes distinguish between different physical channels (PhCH) which are superimposed over the same transmission resource constituted by a carrier frequency. The self- and inter-correlation properties of the spreading codes allow the receiver to separate the PhCHs and to extract the symbols intended for it.

The UMTS type cellular radio communication network includes a core network (CN) 1 including inter-connected switches called MSCs for those which provide circuit switching services, and SGSN for those which provide packet switching services. In the radio access network 2, commonly called UTRAN in the case of the UMTS, radio network controllers (RNCs) 3 are connected to core network switches. Each RNC supervises one or more base stations 4, called Node-B, using an interface designated under the acronym IuB in the UMTS specifications. The Node-Bs are geographically distributed so as to provide the desired radio coverage, and each Node-B serves one or more radio cells 7 covering the zone in which the cellular service is accessible to the public.

For the UMTS in FDD mode on the downstream link (from the UTRAN to the UEs), a primary scrambling code is allocated to each base station, and different physical channels used by this base station are distinguished by mutually orthogonal "channelling" codes. For each PhCH, the overall spreading code is the product of the "channelling" code and the "scrambling" code of the base station. The different physical channels, including common channels and dedicated channels, follow a frame structure in which frames of 10 ms follow in succession over the carrier frequency used by the base station. Each frame is sub-divided into 15 timeslots (or slots) of 666 µs each.

Among the different common physical channels in the downstream direction are a common pilot channel (CPICH), a primary common control physical channel (P-CCPCH), a secondary common control physical channel (S-CCPCH), and a synchronisation channel (SCH).

Femto access points 5 distributed over the radio coverage are of the Node-Bs 4 define small-sized radio coverage 6 which is, if not entirely, almost entirely included within one or more radio cells served by the Node-Bs 4. The radio coverage 6 of a femto access point 5 is fairly low, typically around ten metres. The femto access point 5 may for example consist of an independent device, preferably of small dimensions, intended to be installed in a residential environment, or also in a radio access module embedded in a "gateway" type device also including a television signal decoder. WiFi access, Ethernet access, an ADSL modem, etc. In the non-restrictive example concerned, the radio coverage of a femto access point 5 of the UTRAN radio access network 2 is also a cell, small in size, for example of dimensions allowing it to cover a residential room. The cell 6 of a femto access point, commonly called a "femtocell", is typically included, in full or almost in full, in one or more cells 7 of Node-Bs 4, commonly called "macrocells".

The BTSs 4 and femto access points 5 are capable of communicating over the radio communication interface with the mobile stations 8, 8a, also known as User Equipment (UEs) in accordance with the corresponding specifications of the UMTS system. To do this, the femto access point 5 includes a radio transmission module and a radio reception module.

A femto access point 5 also includes a high-speed transmission link, using for example a DSL type interface, to the Internet network 6, via an IP router 9. This allows the entire femto access points network 5 to be connected to the rest of the UTRAN infrastructure 2 and the core network 1.

A femto access point 5 can be implemented based on different architectures. It can integrate all functions and capacities typically implemented within a base station, or even all the functions of a base station and a base station controller. Conversely, it can only integrate some of the functions usually offered by a base station, and consist for example of a Remote Radio Head (RRH) connected to a controller via its high-speed transmission link.

Each UE 8, 8a may be in several link states with the UTRAN, managed by a Radio Resource Control (RRC) protocol implemented in the RNC and in the UE (see 3G technical specification TS 25.331, "Radio Resource Control (RRC); Protocol Specification (Release 6)", version 6.19.0 published in September 2008 by the 3GPP (3rd Generation Partnership Project), section 7). In some of these states, the UE is in an active connection with the radio communication system, in other words in particular it can send the base station radio signals relating to communication in progress.

When the UE is powered on and in a selected cell without having communication in progress with the UTRAN, it is in a standby state. The initial cell selection and reselection processes are described in the 3G technical specification TS 25.304, version 6.10.0 published in March 2008 by the 3GPP, section 5.2. In this standby state, after selecting a cell, the UE receives system information sent over a broadcast channel (BCH) by the base station of the selected cell (see the aforementioned 3G technical specification TS 25.331). This system information includes access control information in the upstream direction (from the UE to the UTRAN), as well as information relating to the random access procedure on the physical layer. The control information to be broadcast on the BCH is carried by the physical channel P-CCPCH.

The handover scenarios in a UMTS system are described in the 3GPP technical specification TS 25.832, "Manifestations of Handover and SRNS Relocation (Release 4)", version 4.0.0, published in March 2001, The measurement capacities of a UMTS terminal are defined in the 3G technical specification TS 25.215, "Physical layer—Measurements (FDD) (Release 6)", version 6.4.0, published in September 2005.

UMTS user equipment is capable of providing different measurements relating to each neighbouring cell, in particular from the common physical channel CPICH. Therefore, a UE can measure the power level of a signal received in a cell on its CPICH channel. This measurement is named CPICH_RSCP ("Received Signal Code Power"). It can also measure energy per chip received in the cell relative to the power of the noise. This measurement is named CPICH_Ec/N0.

These measurements are used in particular in the handover and cell selection processes. User equipment in communication with a cell or a not of cells in SHO (active set) then measures the ratio between the CPICH_Ec/N0 and/or the CPICH_RSCP for a certain number of neighbouring cells (monitored set) which are designated by the infrastructure. Such measurements allow the procedures for the control of links executed in the access network to estimate a quality level for each cell at a given moment and therefore to select the most suitable cells to serve the user equipment.

In the UMTS systems, the entity of the system which manages and executes the handover procedure is the Radio Network Controller (RNC) which retrieves the measurements taken by the terminals using the RRC protocol described in the aforementioned technical specification TS 25.331, and those taken by the base stations using the NBAP ("Node B Application Protocol" described in the 3G technical specification TS 25.433, version 6.17.0, "UTRAN Iub Interface Node B Application Part (NBAP) Signalling", published in June 2008 by the 3GPP).

Returning to FIG. 2, and in accordance with the handover procedure as defined for the FDD type UMTS networks, once it receives the pilot signal from a base station 4a, 5a of the access network infrastructure 2, the UE 8a takes a measurement P of a dimension which is representative of the quality of the radio transmission between the target base station 4a, 5a and itself. This measurement of the dimension is sent by the latter, by wave channel, to the access network infrastructure 2. This dimension may advantageously be representative of the power of the signals that the UE 8a receives from the target base station 4a, 5a, and correspond to the CPICH-RSCP measurement described above. It may also, in another embodiment better adapted for example to the TDD type UMTS systems, correspond to the measurement of the energy per chip received CPICH-Ec/No described previously. Within the UMTS access network infrastructure, this transmission takes place from the base station which receives the measurement to the radio network controller RNC to which it is connected.

The measurements of the quality of the radio transmission between the UE 8a and a base station 4a, 5a are sent to the base station controller (in this case, for Node-B 4a, an RNC 3 of the UTRAN 2), where they are used for the application of a pre-defined cell transfer criterion. This criterion is recorded in a memory which can be accessed for reading by the node of the radio access network in charge of its application, and it is not necessary for this memory to be colocated on said node. According to one embodiment, this criterion consists of a threshold corresponding to the type of measurements taken by user equipment and sent to the radio access network. For example, in the event that the dimension measured represents a power level of the signal received by the user equipment 8a from the target base station 4a, 5a, the criterion may consist of a threshold against which the dimension measurement is compared. The CPICH-RSCOP measurement is thus compared with an RSCP_Threshold in order to determine whether or not to carry out a handover to the target cell. In the event that the dimension measured represents the energy per chip received by the user equipment 8a from the target base station 4a, 5a, the criterion may also consist of a threshold against which the dimension measurement is compared. The CPICH-Ec/No measurement is thus compared with an Ec/No_Threshold in order to determine whether or not to carry out a handover to the target cell.

The UE 8a is, furthermore, associated with the femto access point 5a, due to a pre-established relation between the user of the equipment UE 8a and the femto access point 5a. This scenario may be encountered frequently in practice, insomuch as the femto type access points are intended for use in a residential environment. From then on, the femto access point device may be purchased or hired to an operator by a user who effectively creates an association between a device and the owner or hiring user ("main" user). This association may be extended to a limited number of users, such as for example the members of the main user's family. These users may each have one or more user equipment item, which leads to the consideration of a set of user equipment, $\{UE_i\}$, associated with the femto access point 5a.

According to one embodiment, this association between one or a plurality of user equipment items and a femto access point is recorded in the access network infrastructure. For a UMTS type radio access network infrastructure as shown in FIG. 2, this association may for example advantageously be recorded in a memory for which the data is accessible and can be used by the base station controllers responsible for implementing the cell transfer procedure (or handover).

This association is exploited during the implementation of the cell transfer procedure for the user equipment $\{UE_i\}$ of the set previously defined, via a second cell transfer criterion applicable to the femto access point 5a. This second criterion does not need to be specific to a particular femto access point of the radio access network in question. On the contrary, it may be advantageous to define this second criterion with a view to applying it for the transfer of cells to the cells of the access points or base stations of a certain type, for example of the femto type in the context of a cellular radio communication system in which the cells deployed are organised according to an HCS type structure.

Therefore, in the example illustrated in FIG. 2, a second cell transfer criterion applicable to the femto access point 5a is defined. When the user equipment 8a enters the coverage of the cell 6 of the femto access point 5a, the UE 8a measures the power of the signal received from the access point 5a of the type CPICH-RSCP, and sends these measurements to the base station with which a radio communication link is established, for example the Node-B 4a. These measurements are sent to a radio network controller RNC 3 responsible for implementing the cell transfer procedure to the cell 6 of the femto access point 5a. This radio network controller compares a user equipment identifier 8a with the identification information of the user equipment associated with the femto access point 5a. This identification information forms part of the information recorded in the memory relating to the association between the pre-defined set of user equipment $\{UE_i\}$ and the femto access point 5a. If the radio network controller determines that the user equipment 8a is one of the user equipment items $\{UE_i\}$ associated with the femto access point 5a, it applies the second cell transfer criterion, and not the first criterion. Otherwise, it applies the first criterion or any other criterion according to the applicable cell transfer procedure.

The second cell transfer criterion may, like the first criterion, consist of a threshold corresponding to the type of measurements taken by user equipment and sent to the radio access network. For example, in the event that the dimension measured represents a power level of the signal received by the user equipment 8a from the target femto access point 5a, the criterion may consist of a threshold against which the dimension measurement is compared. The CPICH-RSCP measurement is thus compared with a CFC_RSCP_Threshold (the acronym CFC designating the customer femtocell) in order to determine whether or not to carry out a handover to the target femtocell. In the event that the dimension measured represents the energy per chip received by the user equipment 8a from the target femto access point 5a, the criterion may also consist of a threshold against which the dimension measurement is compared. The CPICH-Ec/No measurement is thus compared with a CFC_Ec/No_Threshold in order to determine whether or not to carry out a handover to the target femtocell. If it is decided to carry out such a cell transfer, the UE 8a receives a cell transfer command via the base station 4a requiring the creation of a radio communication link on the cell 6 of the femto access point 5a.

The radio access network infrastructure operator may determine the value of the RSCP_Threshold and CFC RSCP_Threshold (or Ec/No_Threshold and CFC_Ec/No_Threshold) thresholds in order to favour cell transfers to femto access point cells. If the thresholds are defined in such a way that the cell transfer is determined once the radio transmission quality measurement between the UE and the target exceeds the applicable threshold, the thresholds applicable to the femto type cells can be chosen lower than the other thresholds. In the example in FIG. 2, it is thus possible to choose a CFC_RSCP_Threshold strictly lower than the RSCP_Threshold, so as to favour the cell transfer from the radio communication link with the UE equipment 8a to the cell 6 of the femto access point 5a, once it is known that the UE 8a is one of the user equipment items associated with the femto access point 5a, even though the UE 8a would receive the signals from the base station 4a with a power greater than the power of the signals received from the femto access point 5a.

Figure 3:
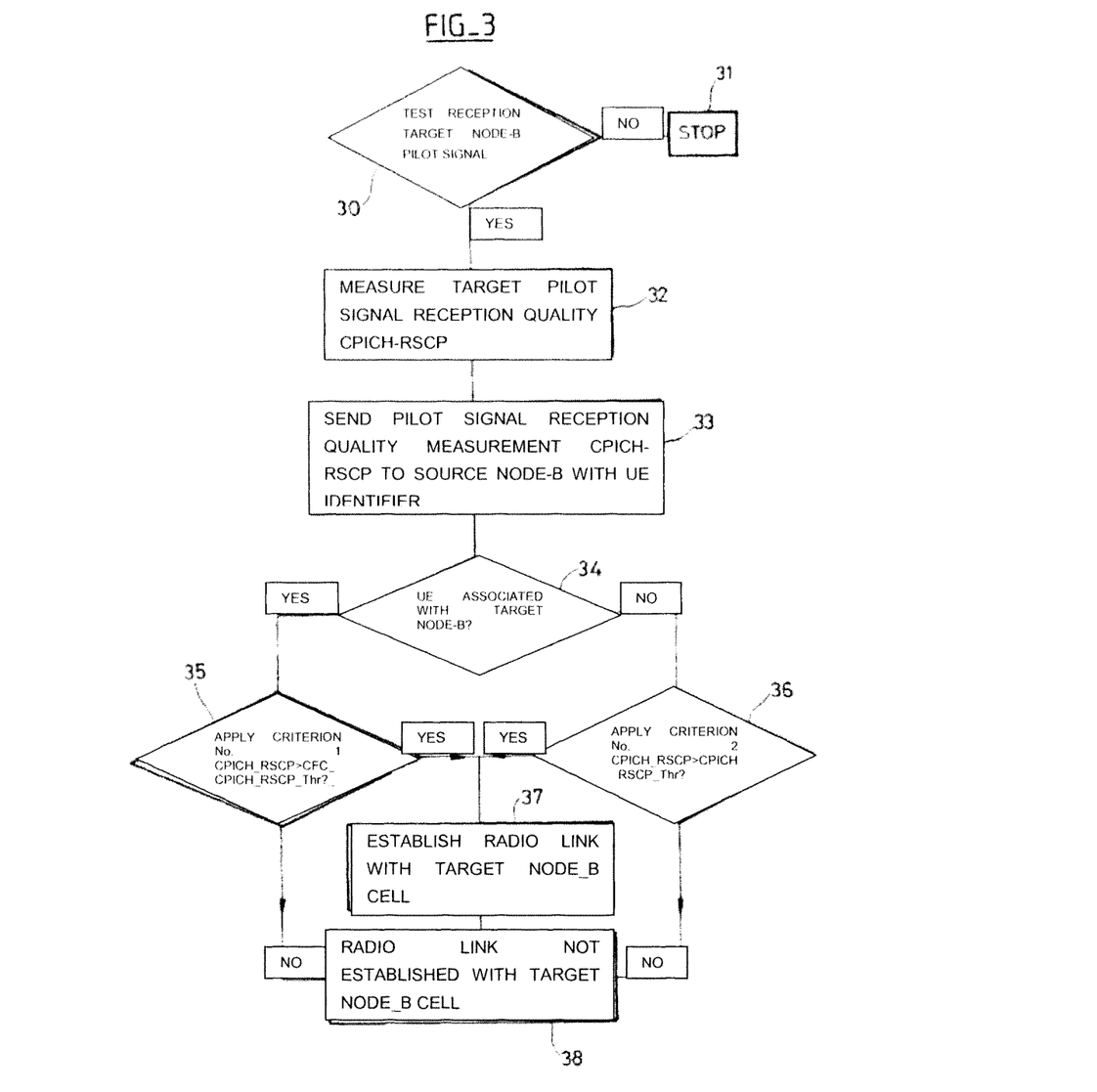
FIG. 3 is a diagram showing the stages of a method according to one embodiment of the invention.

FIG. 3 is a diagram illustrating the method described above. In stage 30 the UE carries out a reception test for the pilot signal (or beacon signal) from a target base station. If it does not receive a pilot signal, a handover to a cell of this base station cannot be envisaged, meaning the method is stopped (stage 31). A loop could therefore be envisaged which tests the reception of pilot signals from base station cells. If the UE receives the pilot signal on a cell of a Node-B, it can then take one or more measurements of the quality of reception of the pilot signal (stage 32), named CPICH-RSCP. This measurement is then sent to the entity of the network capable of deciding on an eventual cell transfer, in the case of the previously described example one or more entities of the radio access network infrastructure via the source Node-B (in other words the Node-B with which a radio communication link is established) (stage 33). The entity of the network capable of deciding on an eventual cell transfer to a cell of the target Node-B determines in stage 34 whether or not the UE is associated with the target Node-B. If this is the case, a first criterion is applied in stage 35 to determine whether or not to transfer a cell to a target Node-B cell by comparing the measurement of the CPICH-RSCP reception quality with a first CFCCPICH_RSCP-Thr threshold. If the CPICH-RSCP measurement is greater than the CFC_CPICH_RSCP-Thr threshold, the cell transfer to a cell of the target Node-B (including, as a minimum, the establishment of a radio link with a target Node-B cell) is carried out (stage 37). Otherwise, a radio link with a cell of the target Node-B is not established (stage 38). If the UE is not associated with the target Node-B, a second criterion is applied in stage 36 to determine whether or not to transfer a cell to a target Node-B cell by comparing the measurement of the CPICH-RSCP reception quality with a second CPICH_RSCP-Thr threshold. If the CPICH-RSCP measurement is greater than the CPICH_RSCP-Thr threshold, the cell transfer to a cell of the target Node-B (including, as a minimum, the establishment of a radio link with a target Node-B cell) is carried out (stage 37). Otherwise, a radio link with a cell of the target Node-B is not established (stage 38).

The invention is not restricted to cellular radio communication systems which support only one type of handover, neither is it restricted by the way in which the handover process is defined in the cellular radio communication system concerned.

An example may be taken from the WiMAX systems (in other words compliant with IEEE 802.16e standards) in which user equipment may take the initiative of requesting a cell transfer to a cell of a target base station. It may be advantageous in systems of this type to allow for the association information described above between one or a plurality of user equipment items $\{UE_i\}$ and an access point to be recorded in the user equipment. The user equipment $\{UE_i\}$ then has an identifier of the access point with which it is associated. When one of the associated user equipment items $\{UE_i\}$ receives the pilot signal or the beacon signal from the access point with which it is associated, it can take measurements of the pilot signal reception quality from this access point, and apply a different handover criterion to the usual criterion once it has recognised that it was within the radio coverage of the access point with which it is associated.

The associated user equipment $\{UE_i\}$ may also be aware of the identifier of one or more macrocells MCi for which the radio coverage considered in combination substantially integrally contains the radio coverage of the cell or cells of the access point with which it is associated. When a radio communication link is established with one of these macrocells MCi, the user equipment may, on its own initiative, test the quality of reception of the pilot signal from the access point with which it is associated.

Figure 4:
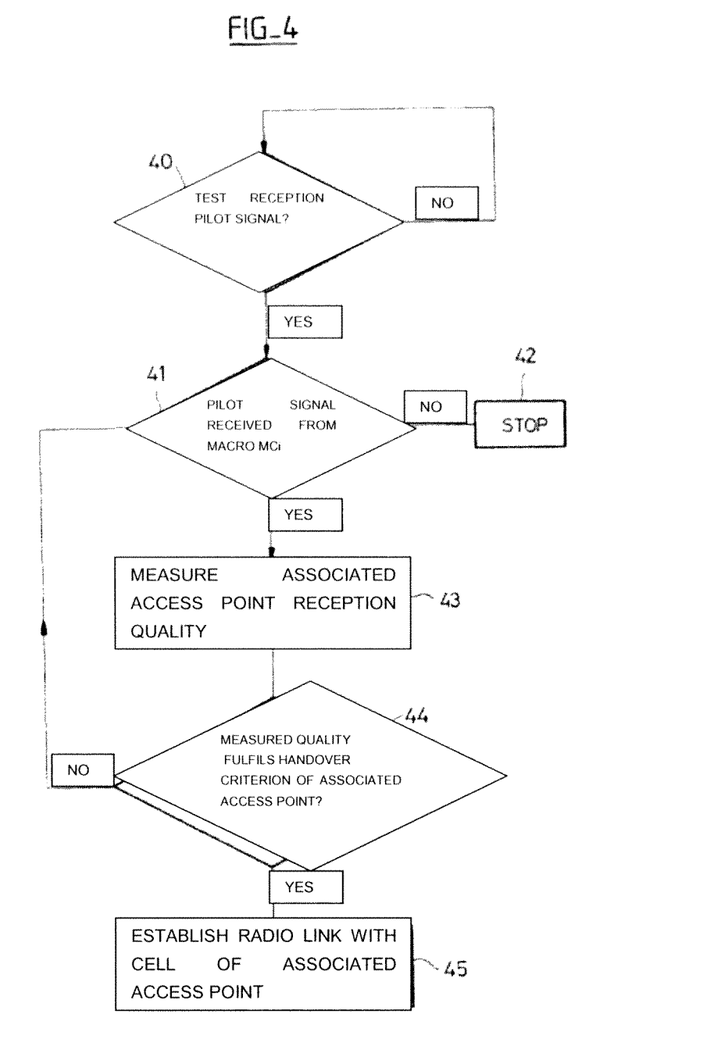
FIG. 4 is a diagram showing the stages of a method according to another embodiment of the invention.

This procedure is illustrated in the diagram in FIG. 4. In stage 40, the user equipment tests whether or not a pilot signal is received. It continues with this test if it does not receive any signal. Otherwise, it checks in stage 41 whether the pilot signal received is that of one of the macrocells MCi for which the radio coverage considered in combination substantially integrally contains the radio coverage of the cell or cells of the radio access point with which it is associated. If this is not the case, the procedure is stopped (stage 42). Otherwise, the user equipment measures the reception quality of signals which may be received from the radio access point with which it is associated (stage 43). The measurement of the signal reception quality is then (stage 44) confronted with the handover criterion for the radio access point with which it is associated, with it being understood that this criterion is different to the handover criterion applied for the access points other than the one with which it is associated. If the criterion applied is fulfilled, the user equipment requires a radio communication link to be established with a cell of its associated radio access point (stage 45). Stage 41 is repeated in the event that the criterion applied is not fulfilled.

The stage for establishing a radio communication link with a cell of the radio access point with which the user equipment concerned is associated can be envisaged both in the context of a "hard" handover and in the context of a "soft" handover. The context of the soft handover corresponds to a particular embodiment of the invention, in which it is considered that the radio communication link established with a cell of the radio access point with which the user equipment concerned is associated can co-exist with one or more other radio communication links established previously with one or more cells of the radio access points of the radio access network infrastructure concerned. It may then be advantageous, in order to comply with a radio resource management strategy aiming to avoid establishing a multitude of radio communication links for user equipment once one of these links is established with a cell of the radio access point with which it is associated, to delete all or some of the other radio communication links established previously.

The stage for establishing a radio communication link with a cell of the radio access point with which the user equipment concerned is associated may furthermore be envisaged independently of a handover context, and the invention is not restricted to this context. In fact, this establishment stage and the determination of the criterion applicable to determine its implementation may for example be envisaged when powering on the user equipment. This will be used to benefit or "force" the establishment of an initial radio communication link with one radio access point rather than another, when the user equipment concerned lies within the radio coverage of a radio access point with which it is associated. For the implementation of the method proposed in its different embodiments, it is not therefore necessary for a radio communication link between the user equipment and a radio access point to previously exist.

Figure 5:
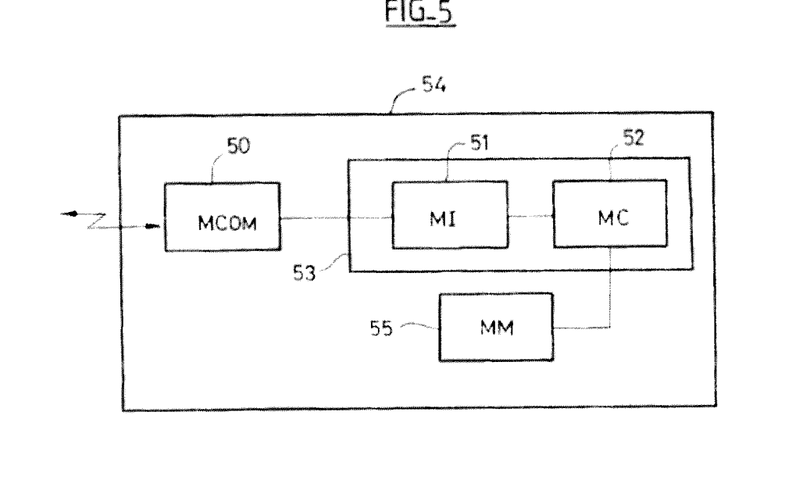
FIG. 5 provides a partial illustration in diagram form of an example of user equipment according to the invention.

The user equipment (54) illustrated in FIG. 5 includes a radio communication links management device (53), and a module for communication (MCOM) over a radio interface (50). The communication module (50) is arranged to communicate over a radio interface with one or more radio access points of an access network infrastructure of a cellular radio communication network, and includes means of receiving radio signals and means of sending radio signals (not shown in the figure). The information carried by the radio signals received by the reception means is sent, after radio processing, to a controller (52) via an interface module (51), capable of communicating with the controller (52) and the communication module (50). The radio communication links management device (53) includes the controller (52) and the interface module (51). The controller (52) is arranged, from the signals received on the radio interface, to test the reception of a pilot signal from a radio access point of the infrastructure within the radio coverage of which the user equipment (54) is located. It receives, in particular, among other information carried by the pilot signal received, identification information of the cell within the radio coverage of which the user equipment (54) is located. The controller (52) is further arranged to obtain one or more identifiers, as applicable, of the cell or cells of a radio access point with which the user equipment (54) is associated, identifiers which are recorded in memory means (55). These memory means (55) may be integrated into the controller (52), or external to the controller (52), or even the user equipment (54) itself. For example, when the user equipment is a mobile terminal, the memory means (55) may be included in an SIM ("Subscriber Identity Module") type module containing information used to identify the radio access point or points with which the mobile terminal is associated. The controller (52) is arranged to compare cell identification information received via the interface module (51) with the identifiers recorded in the memory means (55). It is further arranged, if there is a match, to apply a first criterion for establishing a radio communication link, or if there is no match, to apply a second criterion for establishing a radio communication link. Therefore, if the user equipment (54) is located within the radio coverage of a cell of a radio access point with which it is associated, it may or may not require a radio access link to be established with this cell depending on whether or not this first criterion is fulfilled.

For example, the user equipment may be associated by configuration with a residential type radio access point, or "femto". When it is located within the radio coverage of a cell of its femto access point, and the pilot signal detected is the one sent over a cell by its femto access point, it can apply a criterion for establishing a radio link with its femto access point which will result in preference being given to radio links established with its femto access point, to the detriment of those established or which may be established with a "macro" access point within the radio coverage of which it is also located.

Figure 6:
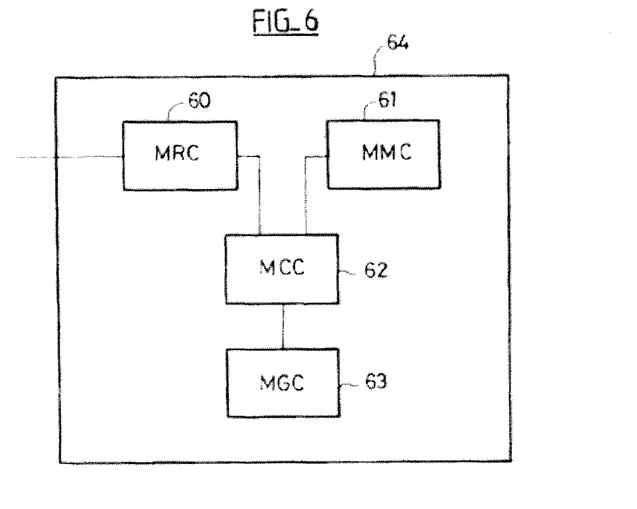
FIG. 6 provides a partial illustration in diagram form of an example of a controller according to the invention.

The controller (64) illustrated in FIG. 6 includes a radio communication links management module (63), a reception module (60), a memory module (61) and a control module (62). The control module (MCC) (62) communicates with the radio communication links management module (63), the reception module (60) and the memory module (61). The reception module (60) is arranged to receive, if necessary via radio access points or the base station if the controller is not integrated with such equipment, information carried by the radio signals sent by user equipment over a radio interface with one or more radio access points of an access network infrastructure of a cellular radio communication network. The controller (64) forms part of an access network infrastructure, and can be implemented in a node independent of the infrastructure, or be combined with other functions of the access network. It may for example be implemented within a base station node or, in the case of a UMTS type access network, within an RNC type node. The reception module (60) is arranged to receive identification information relating to user equipment located within the radio coverage of a radio cell of a radio access point of the infrastructure for which the operations are controlled by the controller (64). The reception module (60) sends the identification information received to the control module (62) for processing. The memory module (61) is arranged to retain in the memory one or more user equipment identifiers corresponding to user equipment associated with the radio access point or one of the radio access points of the infrastructure for which the operations are controlled by the controller (64). The control module (62) retrieves the identifiers retained in the memory in order to compare them with the user equipment identification information received from the reception module (60). The control module is further arranged, when there is a match between the identifiers and the identification information, to request from the radio communication links management module (63) the application of a first criterion for establishing a radio link with a view to establishing, if this first criterion is fulfilled, a radio link between the user equipment and the radio access point concerned. When there is no match between the identifiers and the identification information, the control module (62) requests from the radio communication links management module (63) the application of a second criterion for establishing a radio link, distinct from the first one, with a view to establishing, if this second criterion is fulfilled, a radio link between the user equipment and the radio access point concerned. The radio communication links management module (63) sends the control module (62) the result of the application of the criterion chosen, on which the control module (62) can undertake the procedure for establishing a radio link if the result is positive, in other words if the chosen criterion is fulfilled.

The invention claimed is:

1. Method for the management of the resources of an access network infrastructure of a cellular radio communication network, comprising:
   receiving a radio signal indicative of a quality measure for a radio transmission between a first user equipment and a first radio access point while the first user equipment is located within radio coverage of the first radio access point, wherein the first radio access point is in an access network infrastructure of a cellular radio communication network, the access network infrastructure including a plurality of radio access points, each radio access point serving at least one radio cell and capable of communicating over a radio interface with user equipment located within radio coverage of the corresponding radio access point;
   determining whether the first user equipment belongs to a pre-defined set of user equipment associated with the first radio access point;
   applying a first criterion for determining whether to establish a radio communication link between the first user equipment and the first radio access point if the first user equipment belongs to the pre-defined set of user equipment, wherein the first criterion is pre-defined relative to the quality of transmission between user equipment and the first radio access point, wherein the first criterion is used to determine the radio communication link will be established if the quality measure associated with the radio signal satisfies the first criterion and the first user equipment belongs to the pre-defined set of user equipment;

applying a second criterion for determining whether to establish the radio communication link between the first user equipment and the first radio access point if the first user equipment does not belong to said pre-defined set of user equipment, wherein the second criterion is pre-defined relative to the quality of transmission between user equipment and the first radio access point, wherein the second criterion is used to determine the radio communication link will be established if the quality measure associated with the radio signal satisfies the second criterion and the first user equipment does not belong to the pre-defined set of user equipment;

wherein the second criterion is distinct from the first criterion and the quality of transmission associated with the second criterion is greater than the quality of transmission associated with the first criterion.

2. Method according to claim 1, wherein the first and second criteria include respective first and second thresholds for the quality of transmission between user equipment and the first radio access point.

3. Method according to claim 1, wherein at least some of the radio cells of the plurality of radio access points of the access network infrastructure are distributed to form a plurality of categories, each category containing one or more radio cells based on the size of their respective radio coverage, wherein the first criterion is associated with radio cells of a select category.

4. Method according to claim 1, wherein the quality measure is representative of a level of power of a signal received by the first user equipment from the first radio access point.

5. Method according to claim 1, wherein the access network infrastructure includes a CDMA network infrastructure and the quality measure is representative of a level of energy per chip received by the first user equipment on a pilot channel of the first radio access point.

6. Method according to claim 1, wherein the access network infrastructure includes a second radio access point with which a radio communication link to the first user equipment is established, wherein the radio communication link between the first user equipment and the second radio access point is deleted once the radio communication link between the first user equipment and the first radio access point is established.

7. Method according to claim 1, wherein the first radio access point includes a residential or "femto" type radio access node.

8. The method according to claim 1, wherein the receiving, determining, and applying of the first and second criteria are performed at the first user equipment.

9. The method according to claim 1, wherein the receiving, determining, and applying of the first and second criteria are performed at a network entity configured to manage handover procedures within the access network infrastructure.

10. Device for the management of a radio communication link between user equipment and radio access points of an access network infrastructure of a cellular radio communication network, the device including an interface module configured to receive a radio signal from a first radio access point, the radio signal indicative of a quality measure for a radio transmission between the device and the first radio access point while the device is located within radio coverage of the first radio access point, the radio signal carrying identification information for the first radio access point, wherein the first radio access point is in an access network infrastructure of a cellular radio communication network, the access network infrastructure including a plurality of radio access points, each radio access point serving at least one radio cell and capable of communicating over a radio interface with user equipment located within radio coverage of the corresponding radio access point; and a control module configured to compare the identification information for the first radio access point with identification information for at least one radio access point with which the device is associated;

wherein, when the comparison of the identification information indicates the device is associated with the first radio access point, the control module is configured to apply a first criterion for determining whether to establish a radio communication link with the first radio access point, wherein the first criterion is pre-defined relative to the quality of transmission between the device and the first radio access point, wherein the first criterion is used to determine the radio communication link will be established if the quality measure associated with the radio signal satisfies the first criterion and the device is associated with the first radio access point;

wherein, when the comparison of the identification information indicates the device is not associated with the first radio access point, the control module is configured to apply a second criterion for determining whether to establish the radio communication link with the first radio access point, wherein the second criterion is pre-defined relative to the quality of transmission between the device and the first radio access point, wherein the second criterion is used to determine the radio communication link will be established if the quality measure associated with the radio signal satisfies the second criterion and the device is not associated with the first radio access point;

wherein the second criterion is distinct from the first criterion and the quality of transmission associated with the second criterion is greater than the quality of transmission associated with the first criterion.

11. Device according to claim 10, wherein said first and second criteria include respective first and second thresholds for the quality of transmission between user equipment and the first radio access point.

12. Device according to claim 10, wherein the device is implemented in user equipment, the device further including
a communication module configured to communicate with at least one radio access point of the access network infrastructure of the cellular radio communication network over the radio interface, said radio access point serving at least one radio cell.

13. The device according to claim 10, wherein the device comprises the first user equipment and the first user equipment, the first user equipment comprising the interface and control modules.

14. Radio access point controller for management of resources of an access network infrastructure of a cellular radio communication network, the controller including:

a reception module configured to receive a radio signal from a first radio access point, the radio signal indicative of a quality measure for a radio transmission between a first user equipment and the first radio access point while the first user equipment is located within radio coverage of the first radio access point, the radio signal carrying identification information for the first user equipment, wherein the first radio access point is in an access network infrastructure of a cellular radio communication network, the access network infrastructure including a plurality of radio access points, each radio access point serving at least one radio cell and capable of communicating over a radio interface with user equipment located within radio coverage of the corresponding radio access point;

a memory module configured to retain identification information for a pre-defined set of user equipment associated with said first radio access point;

a management module configured to manage a radio communication link between the first user equipment and the first radio access point and to control establishing the radio communication link;

a control module configured to compare the identification information for the first user equipment with the identification information for the pre-defined set of user equipment;

wherein, when the comparison of the identification information indicates the first user equipment belongs to the pre-defined set of user equipment, the control module is configured to request the management module to apply a first criterion for determining whether to establish the radio communication link between the first user equipment and the first radio access point, wherein the first criterion is pre-defined relative to the quality of transmission between user equipment and the first radio access point, wherein the management module is configured to use the first criterion to determine the radio communication link will be established if the quality measure associated with the radio signal satisfies the first criterion and the first user equipment belongs to the pre-defined set of user equipment;

wherein, when the comparison of the identification information indicates the first user equipment does not belong to the pre-defined set of user equipment, the control module is configured to request the management module to apply a second criterion for determining whether to establish the radio communication link between the first user equipment and the first radio access point, wherein the second criterion is pre-defined relative to the quality of transmission between user equipment and the first radio access point, wherein the management module is configured to use the second criterion to determine the radio communication link will be established if the quality measure associated with the radio signal satisfies the second criterion and the first user equipment does not belong to the pre-defined set of user equipment;

wherein the second criterion is distinct from the first criterion and the quality of transmission associated with the second criterion is greater than the quality of transmission associated with the first criterion.

15. Radio access point controller according to the claim 14, wherein said first and second criteria include respective first and second thresholds for the quality of transmission between user equipment and the first radio access point.

16. The radio access point controller according to claim 14, wherein he radio access point controller comprises a network entity configured to manage handover procedures within the access network infrastructure, the network entity comprising the reception, memory, management, and control modules.

17. The radio access point controller according to claim 14, wherein at least some of the radio cells of the plurality of radio access points of the access network infrastructure are distributed to form a plurality of categories, each category containing one or more radio cells based on the size of their respective radio coverage, wherein the first criterion is associated with radio cells of a select category.

18. The radio access point controller according to claim 14, wherein the quality measure is representative of a level of power for the radio transmission between the first user equipment and the first radio access point.

19. The radio access point controller according to claim 14, wherein the access network infrastructure includes a CDMA network infrastructure and the quality measure is representative of a level of energy per chip on a pilot channel received by the first user equipment from the first radio access point.

20. A non-transitory computer-readable medium storing program instructions that, when executed by a processor, cause a corresponding processor-controlled device to perform a method for management of resources of an access network infrastructure of a cellular radio communication network, the method comprising:

after receiving a radio signal indicative of a quality measure for a radio transmission between a first user equipment and a first radio access point while the first user equipment is located within radio coverage of the first radio access point, determining whether the first user equipment belongs to a pre-defined set of user equipment associated with the first radio access point, wherein the first radio access point is in an access network infrastructure of a cellular radio communication network, the access network infrastructure including a plurality of radio access points, each radio access point serving at least one radio cell and capable of communicating over a radio interface with user equipment located within radio coverage of the corresponding radio access point;

applying a first criterion for determining whether to establish a radio communication link between the first user equipment and the first radio access point if the first user equipment belongs to the pre-defined set of user equipment, wherein the first criterion is pre-defined relative to the quality of transmission between user equipment and the first radio access point, wherein the first criterion is used to determine the radio communication link will be established if the quality measure associated with the radio signal satisfies the first criterion and the first user equipment belongs to the pre-defined set of user equipment;

applying a second criterion for determining whether to establish the radio communication link between the first user equipment and the first radio access point if the first user equipment does not belong to said pre-defined set of user equipment, wherein the second criterion is pre-defined relative to the quality of transmission between user equipment and the first radio access point, wherein the second criterion is used to determine the radio communication link will be established if the quality measure associated with the radio signal satisfies the second criterion and the first user equipment does not belong to the pre-defined set of user equipment;

wherein the second criterion is distinct from the first criterion and the quality of transmission associated with the second criterion is greater than the quality of transmission associated with the first criterion.

21. The non-transitory computer readable medium according to claim 20, the processor controlled device comprising the first user equipment, wherein the receiving, determining, and applying of the first and second criteria are performed at the first user equipment.

22. The non-transitory computer readable medium according to claim 20, the processor controlled device comprising a network entity configured to manage handover procedures within the access network infrastructure, wherein the receiving, determining, and applying of the first and second criteria are performed at the network entity.

* * * * *